United States Patent
Müssig et al.

(10) Patent No.: US 8,833,447 B2
(45) Date of Patent: Sep. 16, 2014

(54) SEPARATING DEVICE FOR TUBULAR FLOW-THROUGH DEVICES

(75) Inventors: Siegfried Müssig, Bad Nenndorf (DE); Klaus Wahrmann, Sprockhövel (DE); Stefanie Wildhack, Kempten (DE); Bernhard Holzmüller, Haldenwang (DE); Samuel Joly, Durach (DE)

(73) Assignee: ESK Ceramics GmbH & Co. KG, Copenhagen (DK)

( * ) Notice: Subject to any disclaimer, the term of this patent is extended or adjusted under 35 U.S.C. 154(b) by 181 days.

(21) Appl. No.: 13/384,989

(22) PCT Filed: Jul. 20, 2009

(86) PCT No.: PCT/EP2009/005257
§ 371 (c)(1), (2), (4) Date: Jan. 19, 2012

(87) PCT Pub. No.: WO2011/009469
PCT Pub. Date: Jan. 27, 2011

(65) Prior Publication Data
US 2012/0125601 A1    May 24, 2012

(51) Int. Cl.
*E21B 43/08* (2006.01)
*B01D 39/20* (2006.01)
*B01D 29/46* (2006.01)
*B01D 46/40* (2006.01)

(52) U.S. Cl.
CPC .............. *B01D 29/46* (2013.01); *E21B 43/08* (2013.01); *B01D 39/2068* (2013.01); *B01D 46/406* (2013.01)
USPC .......................... 166/244.1; 166/235; 166/230

(58) Field of Classification Search
USPC .............. 166/244.1, 230, 235, 227, 157, 278
See application file for complete search history.

(56) References Cited

U.S. PATENT DOCUMENTS

| | | | | | |
|---|---|---|---|---|---|
| 1,533,747 | A | * | 4/1925 | Lough | 166/235 |
| 1,705,848 | A | * | 3/1929 | Austin | 166/235 |
| 1,709,222 | A | * | 4/1929 | Lawlor et al. | 166/235 |
| 1,995,850 | A | * | 3/1935 | Harter | 166/235 |
| 2,250,871 | A | * | 7/1941 | Lumbert | 166/235 |
| 2,314,477 | A | * | 3/1943 | Bodey, Jr. | 166/234 |
| 2,646,126 | A | * | 7/1953 | Goodner | 166/235 |

(Continued)

FOREIGN PATENT DOCUMENTS

WO    99/06669 A1    2/1999

*Primary Examiner* — Daniel P Stephenson
(74) *Attorney, Agent, or Firm* — Nath, Goldberg & Meyer; Jerald L. Meyer (57) ABSTRACT

The invention relates to a separating device for tubular flow-through devices (22) which serve for the extraction of liquids or gases from wells drilled in rock or deep wells, the separating device being suitable for the removal of sand and rock particles and comprising
 an annular stack (20) of brittle-hard annular disks, the disks (30) being stacked and braced in such a way that a separating gap (37) for the removal of sand and rock particles is present in each case between the individual disks (30),
 a coupling-on element (18, 19) at one or both ends of the annular stack (20),
 a clamping device at one or both ends of the annular stack (20), making it possible on the one hand to flexibly brace the brittle-hard disks (30) and on the other hand to variably fasten the annular stack (20) on the tubular flow-through device (22).

29 Claims, 7 Drawing Sheets

(56) References Cited

U.S. PATENT DOCUMENTS

| | | | |
|---|---|---|---|
| 2,746,552 A * | 5/1956 | Grospas | 166/235 |
| 3,009,519 A * | 11/1961 | Brown | 166/235 |
| 3,568,842 A * | 3/1971 | Bozek | 210/307 |
| 3,789,924 A * | 2/1974 | Aaltonen et al. | 166/105.1 |
| 3,822,744 A * | 7/1974 | Reijonen et al. | 166/235 |
| 4,102,395 A * | 7/1978 | Robinson | 166/231 |
| 4,267,045 A * | 5/1981 | Hoof | 210/322 |
| 4,752,394 A * | 6/1988 | McKenzie et al. | 210/488 |
| 4,753,731 A * | 6/1988 | Drori | 210/492 |
| 5,122,271 A * | 6/1992 | Simon et al. | 210/314 |
| 5,249,626 A | 10/1993 | Gibbins | |
| D365,139 S * | 12/1995 | Gibbins | D23/209 |
| 6,298,914 B1 | 10/2001 | Spray et al. | |
| 6,769,484 B2 * | 8/2004 | Longmore | 166/207 |
| 8,196,653 B2 * | 6/2012 | Fripp et al. | 166/235 |
| 8,302,681 B2 * | 11/2012 | Fripp et al. | 166/235 |
| 2011/0220347 A1 * | 9/2011 | Kayser | 166/235 |

* cited by examiner

SEPARATING DEVICE FOR TUBULAR FLOW-THROUGH DEVICES

This is a National Phase Application filed under 35 U.S.C. §371 as a national stage of PCT/EP2009/005257, filed on Jul. 20, 2009, the content of which is hereby incorporated by reference in its entirety.

FIELD OF THE INVENTION

The invention relates to a novel separating device with improved erosion and abrasion resistance, which is suitable for use for flow-through devices for the extraction of oil, water and gas mixtures or the individual components thereof, with the aid of which solids such as sand and rock particles can be removed from the liquids and gases to be extracted. The separating device serves in particular for preventing the erosive and abrasive wearing of the extraction equipment in deep wells by sand and rock particles. At the same time, the separating device is corrosion-resistant with respect to treatment fluids.

BACKGROUND OF THE INVENTION

For the extraction of liquids and gases, such as oil, water and gas mixtures or the individual components thereof, from reservoir rock, well equipment is used, substantially comprising an extraction pipe for conducting the extraction medium from the outside extraction point to the inner extraction pipe. This may be a perforated pipe or a pipe which is provided with at least one opening. These openings are often provided with a suitable device, such as a slide or valve, with the aid of which the influence of the extraction medium can be controlled. This extraction pipe (inner pipe) is also referred to hereafter as a flow-through device; the terms sliding sleeve and sliding side door are also often used.

During extraction, it is necessary to separate the particles from the deposits and any particles artificially introduced or produced by abrasion from the extraction medium and to filter them out before entry into the extraction pipe.

PRIOR ART usually woven wire meshes or metal wire grids are used for this task. A solution with a woven wire mesh is described in U.S. Pat. No. 5,624,560. These solutions with woven wire meshes or wire grids are also carried by a metal supporting structure, to remain mechanically stable. A major disadvantage of this construction is its low resistance to wear. On account of the abrasive or erosive effect of the sand and rock particles flowing in at a high flow velocity, the filters are destroyed and the extraction pipes are damaged, in particular at the openings and valves. At the same time, the productivity of the extraction decreases, since the sand is no longer effectively filtered out but is transported further with the extraction medium. A further problem is the corrosive wear occurring on the filters and extraction pipes as a result of the use of treatment fluids. This corrosive wear in turn exacerbates the abrasive wear. Treatment fluids, such as for example acids, bases, water or hot steam, are used for cleaning the separating device and the flow-through device and for stimulating the well.

It is necessary to improve the resistance of the well equipment to abrasive or erosive wear and to ensure that it is not corrosively attacked.

US 2004/0050217 A1 and WO 2008/080402 A1 describe solutions in which, instead of the metal slotted hole screens, separating devices of porous permeable materials are used. The porous filtering materials of US 2004/0050217 A1 may be metallic, ceramic or organic; in WO 2008/080402 A1, porous ceramic materials are used.

One problem of the solutions described in these two documents is that, on account of their poor mechanical properties, filters of porous materials tend to fracture as a result of flexural loading. The ultimate bending strength is generally well below 30% of that of the corresponding solid material and is therefore not sufficient for the mechanical loads under the operating conditions in wells drilled in rock.

A further problem is that the abrasion and erosion resistance of porous ceramic materials is much less than that of solid ceramic materials.

A further solution with a separating device of porous materials, which likewise has the disadvantages described above, is described in WO 2004/099560 A1. In a further embodiment (page 7, line 24-page 8, line 2 and claim 20), WO 2004/099560 A1 envisages protecting a conventional sand filter on the outside by a sleeve of erosion-resistant, solid rings, which additionally have ribs or grooves on their upper and lower surfaces. On the rings stacked one on top of the other there forms a tortuous fluid channel, on the walls of which the energy of the medium flowing through is reduced by impact, so that the wear of the conventional sand filter lying thereunder is reduced. The rings are preferably formed from carbides or nitrides such as silicon carbide or tungsten carbide. A disadvantage of this solution is that the improved wear protection is accompanied by an energy dissipation of the flowing medium; the outer sleeve does not act as a filter but as a flow resistance, which worsens the output. It is not disclosed how the sleeve is fastened on the extraction pipe.

U.S. Pat. No. 5,249,626 presents a cylindrical screen filter, which comprises a multiplicity of stacked, annular filter segments. The annular stack is held together by a number of threaded rods with threaded nuts or else double nuts of high-grade steel respectively at the upper and lower ends. The separation of the particles takes place at the variable annular gap, which is formed between opposing filter segments. The rings are of plastic, preferably of glass-reinforced polypropylene (column 4, lines 50-54). The threaded rods are guided through openings provided for them in the rings (column 4, lines 31-33). This solution cannot be realized from ceramics. The cross-sectional transitions are angular; the filter segments are of a design typical for plastics. The spacers are of a flat form; they do not allow compensation for flexural stresses if the rings are ceramic. The rigid mounting of the supporting structure would also not allow the acceptance of deformations if the rings were ceramic; this however is absolutely necessary when the filter is introduced into the well. Further disadvantages of the screen filter described in U.S. Pat. No. 5,249,626 of glass-reinforced polypropylene are its insufficient erosion/abrasion resistance and insufficient corrosion resistance.

OBJECT OF THE INVENTION

While overcoming the disadvantages of the prior art, the invention is based on the object of providing a separating device for tubular flow-through devices for removing sand and rock particles in the extraction of liquids or gases from deep wells or wells drilled in rock which has better wear or abrasion and erosion resistance and a lower tendency to fracture than the separating devices known in the prior art and which moreover is corrosion-resistant to treatment fluids, and with which the output is not disadvantageously influenced by the wear protection, and which can withstand the flexural loads occurring during extraction and particularly during installation.

SUMMARY OF THE INVENTION

The above object is achieved according to the invention by a separating device according to claim 1 and the use thereof according to claim 23. Advantageous and particularly expedient refinements of the subject matter of the application are specified in the subclaims.

The subject matter of the invention is consequently a separating device for tubular flow-through devices which serve for the extraction of liquids or gases from wells drilled in rock or deep wells, the separating device being suitable for the removal of sand and rock particles and comprising an annular stack of brittle-hard annular disks, the disks being stacked and braced in such a way that a separating gap for the removal of sand and rock particles is present in each case between the individual disks, a coupling-on element at one or both ends of the annular stack, a clamping device at one or both ends of the annular stack, making it possible on the one hand to flexibly brace the brittle-hard disks and on the other hand to variably fasten the annular stack on the tubular flow-through device.

The subject matter of the invention also covers the use of the separating device according to the invention for removing sand and rock particles in a process for extracting liquids or gases from wells drilled in rock or deep wells by means of tubular flow-through devices.

The separating device made up of brittle-hard annular disks (hereafter also referred to as "annular elements") is abrasion- and erosion-resistant and corrosion-resistant and is designed suitably for ceramic and suitably for brittle-hard materials. The removal of the particles in direct oncoming and passing-through flow is ensured, without the flow being adversely influenced by deflection or energy dissipation.

Apart from the stack of annular disks, the separating device comprises a clamping device (clamping set), which makes it possible on the one hand to flexibly brace the brittle-hard annular elements and on the other hand to variably fasten the annular stack on the extraction pipe.

The flow-through device is protected in its entirety against abrasion/erosion, to be precise in the region of direct passing-through flow, that is to say the region of the openings and valves of the inner pipe. The protection is provided by the annular elements. Preferably, the clamping sets, sections of pipe and connecting points lying outside this region can also be protected.

The tubular flow-through devices may have various cross-sectional forms, a round cross-sectional form being preferred. Furthermore, the tubular flow-through devices may also have cross-sectional areas which change over the length.

The complete separating device is mounted suitably for ceramic or brittle-hard materials; deformations can be accepted without the risk of the annular elements of the brittle-hard material fracturing.

The resilient mounting of the annular stack makes it possible for the annular stack to compensate for bends of the inner pipe. Bends of 3° and more over 30 m can be compensated without any difficulty. The resilient mounting is achieved on the one hand by the clamping sets and compression springs, on the other hand by the preferred concave shaping of the annular base and the depressions which are preferably provided on the annular base, receive the spacers and lead overall to a mobility of the system, so that bends can be compensated.

The pressure loss of the separating device according to the invention is negligible and the separating device according to the invention is flowed through in a laminar manner (see Example 3), so that the output is not disadvantageously influenced.

The separating device can be used with any deviation of the drilled well, both in a horizontal well and in a vertical well, and also under any other well inclination, for example under a well inclination of 60°. This is an advantage over the metal wire grids that are conventionally used.

The connection of the annular stack to the flow-through device, that is to say the inner extraction pipe, is designed such that, in the preferred embodiment, the flow-through device is not changed, i.e. to fit the separating device according to the invention it is not necessary for the commercially obtainable inner pipe to be modified, for example by machining such as by turning, milling or drilling, or by being connected to the separating device by thermal processes, such as for example welding, or else by adhesive bonding.

A further advantage is that the sand and rock particles to be removed can build upon the stable brittle-hard annular elements as what may be called a secondary filter cake (secondary gravel pack). The stability of this secondary filter cake is enhanced by the separating device according to the invention, which leads to an increase in the integrity of the drilled well.

A further advantage is that the separating device according to the invention does not require a supporting structure like the plastic filter segments in U.S. Pat. No. 5,249,626 or the metal wire grids of U.S. Pat. No. 5,624,560.

BRIEF DESCRIPTION OF THE DRAWINGS

The invention is explained in more detail on the basis of the drawings, in which.

DETAILED DESCRIPTION OF THE INVENTION

The separating device according to the invention comprises brittle-hard annular disks, which can be produced easily and cost-effectively. The production of the annular disks is possible by means of powder-metallurgical or ceramic processes in automated mass production. The annular disks may be produced by what is known as the net-shape process, in which the annular disks are pressed in near net shape from powders. Complex machining of the annular disks is not required. The deviations in shape and size of the individual annular disks that are to some extent unavoidable in a sintering process are tolerable with a construction of the separating device according to the invention.

The annular disks used in the separating device are represented in FIGS. 1a-1f. They are produced from a brittle-hard material, preferably a ceramic material, which is abrasion/erosion-resistant to the sand and rock particles and corrosion-resistant to the extraction media and the media used for cleaning, such as for example acids.

The removal of the sand and rock particles takes place at a radial, preferably narrowing gap, which forms between two braced annular elements lying one on top of the other. The annular elements are designed suitably for ceramic or suitably for brittle-hard materials, i.e. cross-sectional transitions are configured without notches and the forming of flexural stresses is avoided or compensated within the structural design.

The inside diameter of the annular disks must be chosen greater than the diameter of the inner pipe (extraction pipe); the annular disks do not lie on the inner pipe. This ensures that the bending occurring during introduction into the well can be absorbed by way of the construction of the annular stack and a fracture of the ceramic elements is avoided.

The height of the annular disks is dependent on the through-flow rate required.

FIGS. 1a-1f show the basic form of an annular disk 30 according to the invention, which has on its upper side at least three spacers 32, which are distributed uniformly over the circular circumference of the disks and with the aid of which the height of the separating gap (gap width) is set. As can be seen from the side view according to FIG. 1d and the enlarged sectional view according to FIG. 1e along the line B-B in FIG. 1a, the spacers 32 are preferably given the form of spherical portions or segments, in order to achieve point contact between opposing annular disks 30 and avoid surface-area contacts.

However, it is also possible for there to be a linear contact or surface-area contact between opposing annular disks. A linear contact is obtained, for example, if the upper sides of the annular disks have a wave-shaped structure. A surface-area contact may be achieved, for example, by way of elliptical plateaus. However, other shapings are also possible. During stacking one on top of the other, the individual spacers are positioned in line one above the other in the stack. The spacers are not separately applied elements, they are formed directly during the production of the annular disks.

Figures 1A, 1B, 1C, 1D, 1E, 1F:
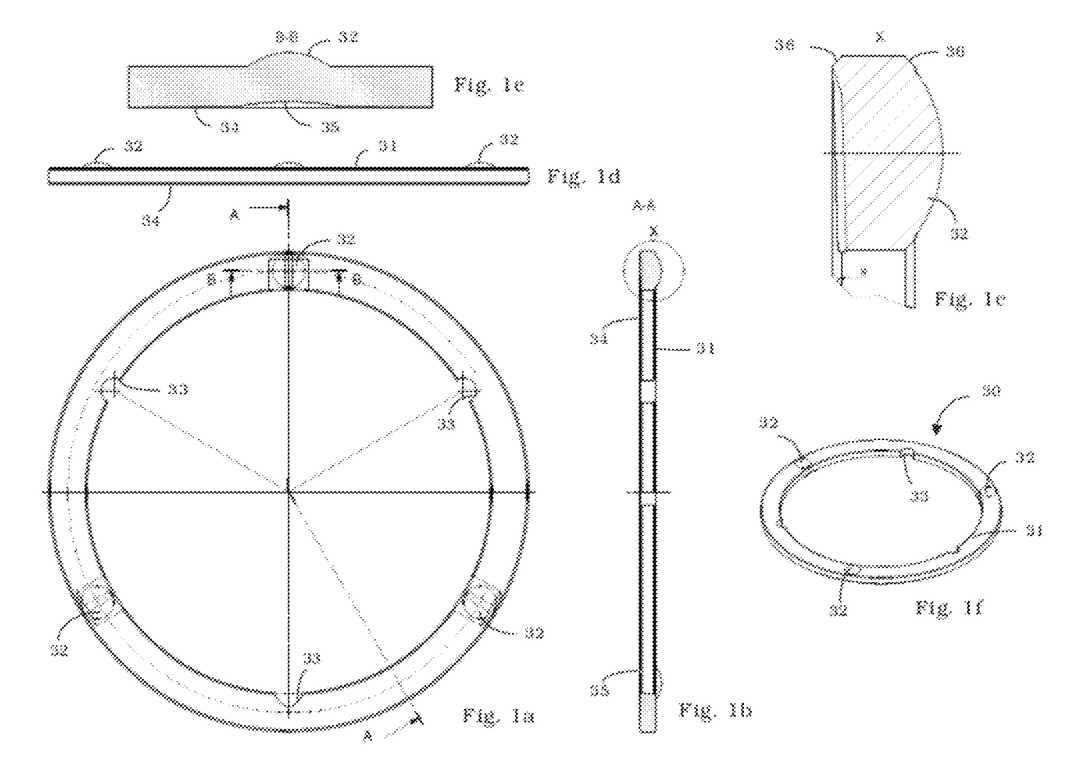
FIGS. 1*a*-1*f* show various views of an annular disk according to the invention.

FIG. 1b shows a sectional view along the line A-A in FIG. 1a. An enlarged representation of the region X through a spacer 32 is shown in FIG. 1c. A perspective view of an annular disk according to the invention is represented in FIG. 1f.

The annular disks 30 preferably have on their inner circumferential surface at least three clearances/grooves 33, which serve for receiving guiding rods 9. These guiding rods 9 allow the rings to be positioned more easily in line one above the other during installation. The clearances are preferably shaped such that they are rounded-off, as shown in FIGS. 1a and 1f.

The upper side 31 of the annular disks 30 may be configured at a right angle to the disk axis or sloping down inward or outward with a planar or curved surface. An inwardly sloping-down configuration is advantageous with respect to a reduced tendency for the separating device to clog.

The underside 34 (annular base) of the annular disks 30 is formed sloping down outward or inward, preferably sloping down inward; more preferably it is formed concavely, as shown in FIG. 1c. The concave shaping should be understood as applying to the annular base as a whole. Here, the annular base is configured with a radius R. The concave shaping allows the individual annular disks to easily evade flexural loading. Possible deviations in shape and size can be easily compensated by the concave shaping of the annular base in combination with the three-point contact.

Furthermore, the inwardly sloping-down form of the underside prevents off-center displacement of the individual rings in the stack. This radial self-centering of the annular stack makes it possible to use the separating device without a supporting structure, which is generally necessary and customary in the case of metal rings or plastic rings, see for example in U.S. Pat. No. 5,249,626 or in U.S. Pat. No. 5,624,560.

On the underside 34 of the rings there are preferably additionally at least three depressions 35, in which the spacers 32 of the opposing upper side of the next annular segment can be positioned. The number and spacing of the depressions 35 depend on the number and spacing of the spacers 32 on the upper side of the ring 31.

The depressions 35 introduced serve as a means for preventing twisting of the rings and assist the self-centering of the rings in the stack. The depressions are preferably areas displaced parallel to the radius R (see FIG. 1c). Thus, point contact is also ensured here with respect to the spacers, and possible deviations in shape and size can be compensated by way of the three-point contact. The depressions 35 may also be given the form of spherical or cylindrical portions. A rounded-off trapezoidal form or a wave-shaped structure is also possible.

The cross-sectional form of the annular disks is preferably not rectangular and not trapezoidal on account of the preferably concavely curved surfaces. It also preferably does not have sharp edges and cross-sectional transitions.

In a preferred embodiment, the outer contours 36 of the annular disks 30 are configured with a bevel, as illustrated in FIG. 1c. According to another preferred embodiment, the edges may also be rounded. This represents still better protection of the edges from the edge loading that is critical for brittle-hard materials.

The circumferential surfaces (lateral surfaces) of the annular disks are preferably cylindrical (planar). However, it is also possible to shape the circumferential surfaces outwardly, for example convexly, in order to achieve a better oncoming flow.

The radial wall thickness of the annular disks is preferably at least 2.5 mm, more preferably at least 5 mm. The height of the disks is preferably 1 to 20 mm, more preferably 1 to 10 mm.

The outside diameter of the annular disks is less than the inner diameter of the well or than the inside diameter of the well casing. It is usually 50-200 mm.

The gap width of the separating gaps 37 is chosen according to the sand fraction to be separated. The gap width is at the smallest at the outside diameter, in order to avoid clogging of the annular gap. The gap width is set by way of the height of the spacers on the upper side of the ring, the depth of the depressions on the underside of the ring and the form of the underside of the ring, i.e. by way of the radius of the preferably concavely curved surface. The gap geometry chosen ensures that the flow processes in the gap are laminar and that the pressure loss between the outside diameter and the inside diameter is small.

The separating device can be backflushed. Liquid treatment media can be used to loosen the filter cake, and consequently increase the output again.

The brittle-hard material of the annular disks is preferably chosen from oxidic and non-oxidic ceramic materials, mixed ceramics of these materials, ceramic materials with the addition of secondary phases, mixed materials with fractions of ceramic hard materials and with a metallic binding phase, precipitation-hardened casting materials, powder-metallurgical materials with hard material phases formed in situ and long- and/or short-fiber-reinforced ceramic materials.

Examples of oxidic ceramic materials are $Al_2O_3$, $ZrO_2$, mullite, spinel and mixed oxides. Examples of non-oxidic ceramic materials are SiC, $B_4C$, $TiB_2$ and $Si_3N_4$. Ceramic hard materials are, for example, carbides and borides. Examples of mixed materials with a metallic binding phase are WC—Co, TiC—Fe and $TiB_2$—FeNiCr. Examples of hard material phases formed in situ are chromium carbides. An example of fiber-reinforced ceramic materials is C—SiC.

The aforementioned materials are distinguished by being harder than the typically occurring rock particles, that is to say the HV or HRC hardness values of these materials lie above the corresponding values of the surrounding rock. All these materials are at the same time distinguished by having greater brittleness than typical unhardened steel alloys. In this sense, these materials are referred to herein as "brittle-hard".

Materials with a density of at least 90%, more preferably at least 95%, of the theoretical density are preferably used, in order to achieve the highest possible hardness values and high abrasion and corrosion resistances. Sintered silicon carbide (SSiC) or boron carbide are preferably used as the brittle-hard material. These materials are not only abrasion-resistant but also corrosion-resistant to the treatment fluids usually used for flushing out the separating device and stimulating the well, such as acids (e.g. HCl), bases (e.g. NaOH) or else steam.

Particularly suitable are, for example, SSiC materials with a fine-grained microstructure (mean grain size<5 μm), such as those sold for example under the names EKasic® F and EKasic® F plus from ESK Ceramics GmbH & Co. KG. Furthermore, however, coarse-grained SSiC materials may also be used, for example with a bimodal microstructure, preferably 50 to 90% by volume of the grain size distribution consisting of prismatic, platelet-shaped SiC crystallites of a length of from 100 to 1500 μm and 10 to 50% by volume consisting of prismatic, platelet-shaped SiC crystallites of a length of from 5 to less than 100 μm (EKasic® C from ESK Ceramics GmbH & Co. KG).

The coupling-on elements 18, 19 (see FIGS. 2a-2c, 3, 4a and 4b) form the end-side, lateral terminations of the annular stack, by way of which the separating device is coupled onto the clamping device (the clamping sets). They are designed such that the clamping forces are transferred uniformly to the annular stack.

The coupling-on elements are preferably produced from the same material as the rings. Alternatively, however, corrosion-resistant steels and plastics, such as for example fluoroelastomers or PEEK (polyether ketone), may also be used.

The upper surface of the upper coupling-on element A (18 in FIG. 4a), which is directed toward the clamping device, preferably has a planar/flat surface. The surface directed toward the separating device, that is to say the underside of the coupling-on segment A, is preferably configured with a radius, i.e. is preferably concave like the annular elements. The inner circumferential surface preferably has three or more clearances/grooves (39 in FIG. 2a) for receiving the guiding rods 9. The outer circumferential surface preferably has a peripheral groove (38 in FIGS. 2b and 2c) for receiving a sealing ring (O-ring) (14 in FIGS. 3 and 4a).

The lower surface of the lower coupling-on element B (19 in FIG. 4b), which is directed toward the clamping device, preferably has a planar/flat surface. The surface directed toward the separating device, that is to say the upper side of the coupling-on segment B, preferably has at least three spacers, uniformly distributed over the circular circumference of the disks. The inner circumferential surface preferably has three or more clearances/grooves (39 in FIG. 2a) for receiving the guiding rods 9. The outer circumferential surface preferably has a peripheral groove (38 in FIGS. 2b and 2c) for receiving a sealing ring (O-ring) (14 in FIGS. 3 and 4b).

The tolerances of the two coupling-on elements have been chosen closer than those of the annular disks, in order to couple the brittle-hard components optimally onto the metal components of the clamping set; by contrast with the unworked (as-sintered) annular disks, the coupling-on segments must be machined.

Figure 2A:
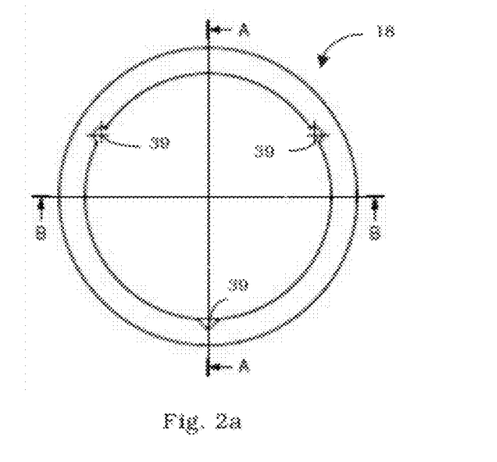
FIGS. 2*a*-2*c* schematically show various views of an annular stack with coupling-on elements.
Figure 2B:
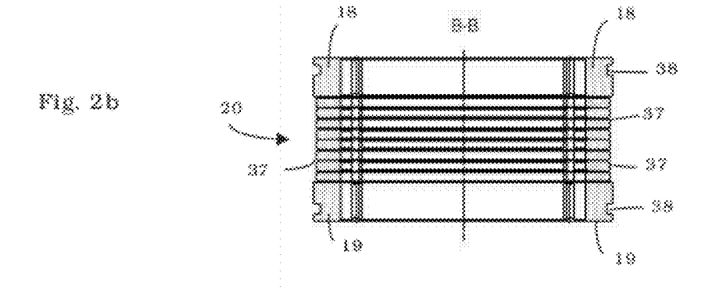
Figure 2C:
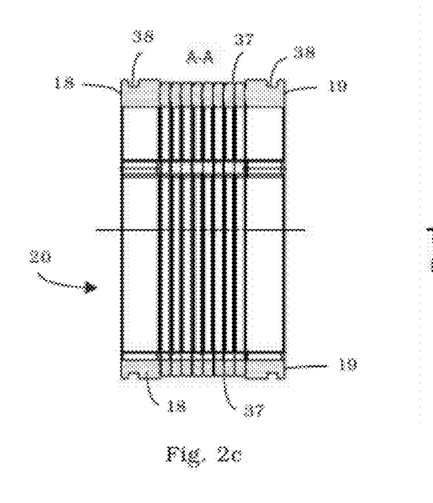

FIGS. 2a-2c show an annular stack 20 according to the invention with coupling-on elements 18, 19. In the plan view according to FIG. 2a, the clearances/grooves 39 in the inner circumferential surface, which serve for receiving the guiding rods 9 (see FIGS. 3, 4a and 4b), can be seen.

FIG. 2b shows a cross-sectional view along the line B-B in FIG. 2a, in which the peripheral grooves 38, which serve for receiving a sealing ring, can be seen. The separating gaps 37 between the individual annular disks can likewise be seen. FIG. 2c shows a corresponding cross-sectional view along the line A-A in FIG. 2a.

The outside diameter of the coupling-on segments 18, 19 is equal to or greater than that of the annular disks. For handling reasons, however, it is preferred that the outside diameter is greater (see FIGS. 2b and 2c).

In an alternative embodiment, the upper surface of the upper coupling-on element A and/or the lower surface of the lower coupling-on element B is not formed as planar/flat but as a spring seat. In this way, the compression springs are directly received and additionally protected from the extraction medium.

The preferably provided spacer serves in particular as an assembling and guiding aid and as protection for the separating device when it is being let into the well, but is not absolutely necessary. It does not contribute to the function of the separating device itself. This is important particularly because the materials used have a lower abrasion and corrosion resistance and wear more quickly during the operation of the extraction unit. Since, however, the spacer does not have any load-bearing/mounting task and, according to the invention, the annular stack is designed such that it is self-centering, the function and the stability of the separating device remain uninfluenced by the wearing of the spacer.

The spacer preferably comprises three components: two guiding rings (7, 8 in FIGS. 3, 3a, 4a and 4b), the spacer strips (12 in FIG. 3a) and the guiding rods (9 in FIGS. 3, 3a, 4a and 4b).

Figure 3:
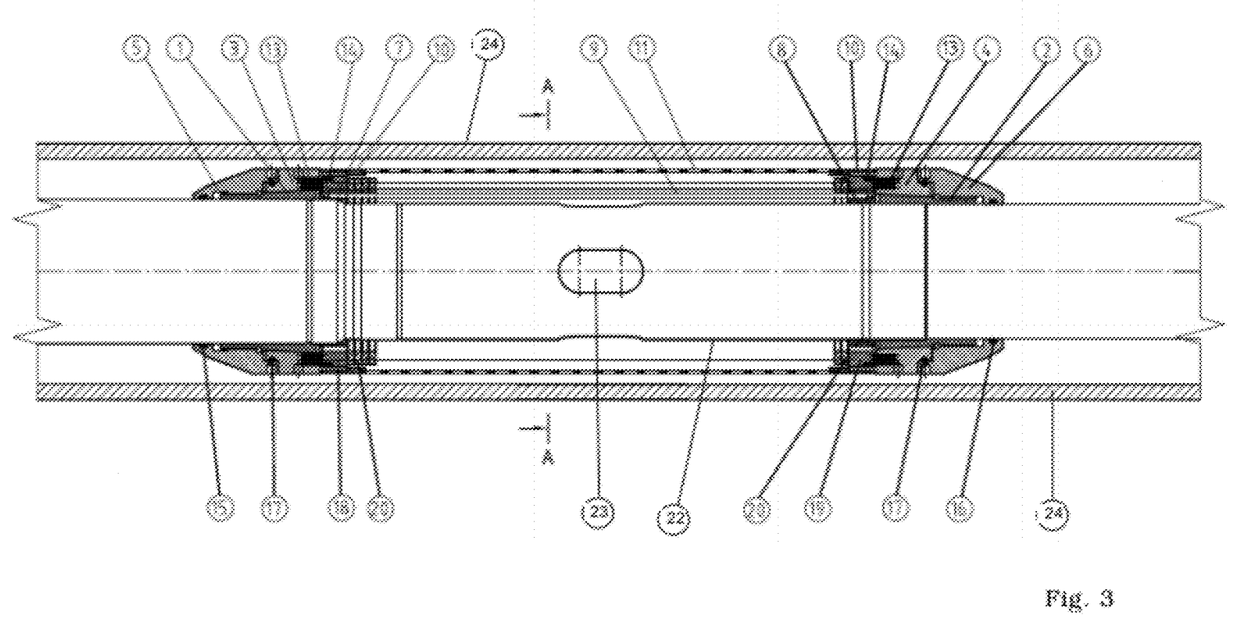
FIG. 3 shows a flow-through device with a separating device according to the invention, including an outer cage for covering the separating device.
Figure 3A:
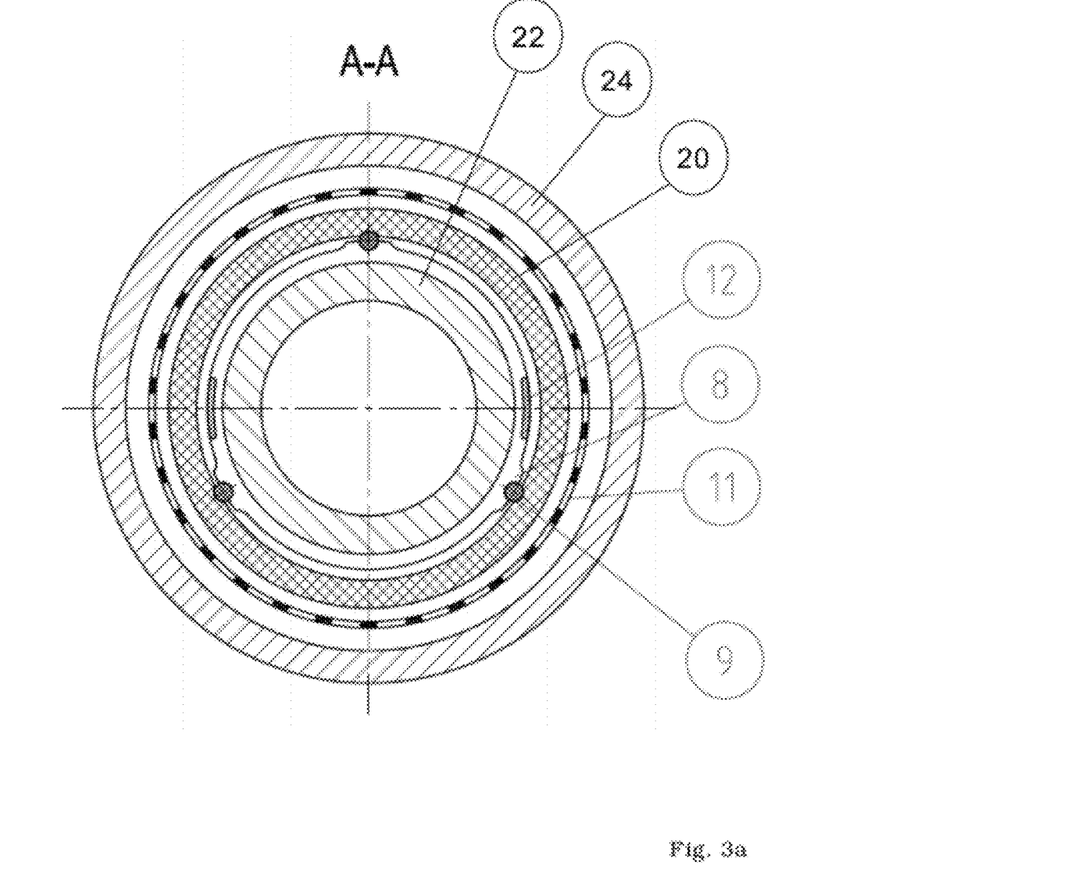
FIG. 3*a* shows a cross-sectional view A-A with respect to FIG. 3.

The two guiding rings 7, 8 lie on the inner pipe (extraction pipe 22). Three or more clearances/grooves, which serve for receiving the guiding rods 9, have been introduced on their outer circumferential surfaces. Directed along the pipe axis of the inner pipe, these guiding rods 9 receive the annular elements at the inner clearances of the ring. The guiding rings 7, 8 and guiding rods 9 together represent the radial distance between the annular elements and the inner pipe 22. The spacer strips 12 are likewise fastened to the outer circumferential surfaces of the guiding rings, preferably by means of spot welding, and set the lengthwise distance between the clamping sleeves 1, 2, that is to say the length of the annular stack 20.

During assembly, the annular disks 30 are built up together with the two coupling-on elements on the spacer. With the aid of the flexible guiding rods 9, the annular elements are aligned and guided during assembly. The spacers 32 of the annular disks 30 that are arranged on the upper side of the rings can thus be quickly and easily aligned respectively one above the other when they are stacked one on top of the other, so that the axial load introduction takes place in the axis of the three spacers 32. As a result, the edge loadings that are critical for brittle-hard materials are avoided, and three-point contact is achieved at the desired contact points even in the case of annular disks with dimensional deviations.

The guiding rings 7, 8 and the spacer strips 12 are preferably made of steel, but it is also possible to use guiding rings made of plastic.

The guiding rods are preferably not produced from steel, but from plastic, preferably from PEEK, in order to make it possible for the brittle-hard annular disks to be received in a flexible, sliding manner. Should the plastic rods become worn, the separating device remains intrinsically stable on account of the "self-centering", and the function continues to be ensured.

The fastening of the annular stack on the inner pipe (extraction pipe) preferably takes place by means of a clamping device (clamping set).

The clamping device preferably comprises clamping sleeves, compression springs, compression spring seats and clamping nuts.

The task of the clamping set (1 to 6 in FIGS. 3, 4a and 4b) is to brace within themselves the annular elements stacked axially one on top of the other, to fix the separating gap formed between the individual disks to a height preferably of 0.05-1 mm, more preferably 0.1-0.5 mm, and to fasten the separating device on the inner pipe (extraction pipe).

With the aid of the clamping set and the compression springs 13, the annular stack is flexibly braced, i.e. deformations (bends) can be accepted, and is variably fastened on the inner pipe. Separating devices of any desired length can be put together and the separating device can be mounted on extraction pipes of different types.

The compression springs (13 in FIGS. 3, 4a and 4b) provide elastic compensation and thus allow flexural deformation of the separating device, which affords protection in particular during introduction into the well and from fracture under overloading.

The compression springs 13 are preferably chosen from corrosion-resistant steel, coated steel or corrosion-resistant elastomer, such as for example rubber or Viton.

The clamping set for fastening the separating device on the inner pipe is preferably configured as a three-part frictionally engaging, releasable pressing assembly. It comprises the components clamping sleeve (1, 2 in FIGS. 3, 4a and 4b), compression spring seat (3, 4 in FIGS. 3, 4a and 4b) and clamping nut (5, 6 in FIGS. 3, 4a and 4b).

The clamping sets are preferably produced from steel, more preferably from corrosion-resistant steel.

Figure 4A:
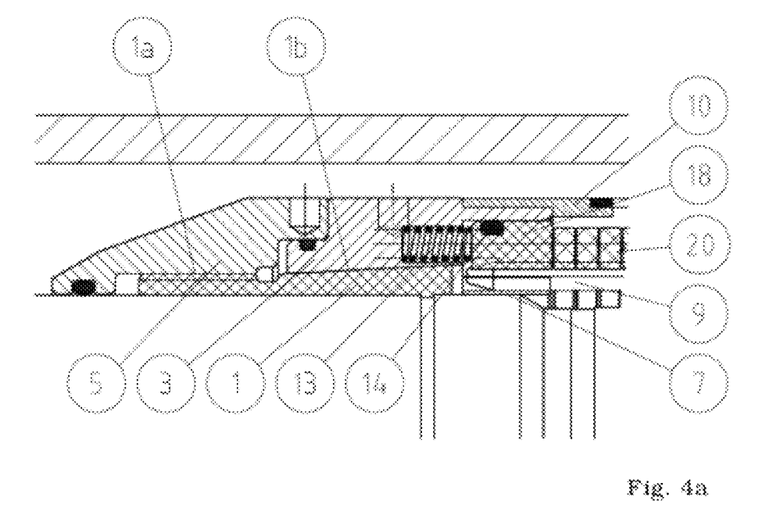
FIGS. 4*a* and 4*b* show clamping devices for bracing the annular stack and for fastening the annular stack on the tubular flow-through devices.
Figure 4B:
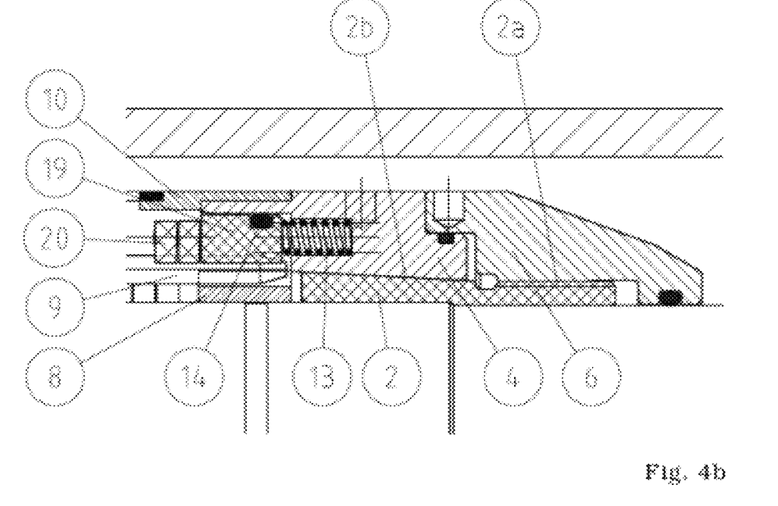

The clamping sleeves 1, 2 are cylindrical on the inside; on the outside, two regions can be distinguished: a thread (1a, 2a in FIGS. 4a and 4b) and an outer, conical wedge surface (1b, 2b in FIGS. 4a and 4b). By means of the thread, the clamping nut acts on the clamping sleeve. The conical wedge surface is preferably slit in the longitudinal direction, in order to allow greater fitting clearances, and consequently relatively great tolerances. The clamping sleeves may preferably be coated on the outside with copper for protection from contact corrosion.

The compression spring seats (3, 4 in FIGS. 3, 4a and 4b) preferably have an inner conical clamping surface, inner guides for receiving the compression springs and an outer guide for receiving the outer cage (11 in FIGS. 3 and 3a; 10 serves for receiving the outer cage).

The clamping takes place by means of the clamping nuts 5, 6. The axial clamping force has the effect that the clamping sleeve 1, 2 and the compression spring seat 5, 6 are displaced one inside the other, elastically deforming and producing high pressing forces in the gaps between the clamping element and the inner pipe, and thereby bringing about the frictional engagement.

The device is sealed by means of O-rings 15, 16 between the inner pipe and the clamping nut, by means of O-rings 17 between the clamping nut and the compression spring seat and by means of O-rings 14 between the compression spring seat and the coupling segment.

Alternative types of fastening rather than a thread and clamping nut are the combinations of a groove and a securing ring as well as a countersunk bore and a grub screw. Fastening by means of welding is also possible.

Furthermore, it is conceivable to choose as an alternative to flexible reception on both sides, flexible reception on one side. This is possible, for example, if the clamping takes place against a fixed stop on the extraction pipe. This stop may alternatively be formed as a planar surface or as a spring seat.

As an alternative to fastening on the extraction pipe, fixing on the threaded sleeves, i.e. the transition between different units of extraction equipment, may also be chosen.

The separating device according to the invention is preferably protected from damage during installation and when commencing extraction by an outer cage which can be flowed through freely (11 in FIGS. 3 and 3a).

This cage may, for example, be configured as a coarse-meshed screen and preferably as a perforated plate. Preferably steel is used as the material.

Alternatively, however, it is also conceivable to use a polymer casing which cannot be flowed through, which affords protection during installation but then when extraction commences is broken up by the abrasion, and consequently exposes the separating device.

The outer surfaces of the clamping sets and the sections of the extraction pipe that are not protected by the brittle-hard rings as well as the connecting points/sleeve regions in which the extraction pipe is completed with other components to form the drilling pipe string are preferably protected from wear by one or more protective enclosures.

In principle, the stream of liquid is made to pass from the extraction point directly through the annular stack into the extraction pipe, without any deflection of the flow. However, it is unavoidable that, as a consequence of stray flows, as a consequence of imprecise positioning of the separating device in relation to the extraction point or if the extraction point is more expansive than the separating device, the regions lying outside the separating device will also be subjected to flow, so that there will also be wearing of the regions of the extraction pipe lying outside the separating device. The wear is caused by abrasion/erosion due to sand and rock particles and by corrosion. The corrosion occurs as a consequence of the treatment fluids that are used, such as for example HCl, $H_2SO_4$, HF and $CaCl_2/CaBr_2$, in particular in conjunction with the particle erosion occurring, which prevents the formation of passivating surface layers.

The wear protection of the aforementioned metal regions lying outside the separating device preferably takes place by means of a plastic covering, for example by means of a shrink-fit tube. However, it is also possible to achieve the wear protection by (powder) coatings, by covering mats, films or sheets, which are fixed for example by means of mechanical clamping, or else by molded parts. The molded parts may be designed, for example, in the form of two half-shells, for example of polyolefin, that have been worked to size. The half-shells may be connected by means of a tongue and groove or else by screwing.

In order to prevent damage to the protective enclosure during installation, suitable spacers may be provided, it being possible for these to be realized for example as sliding nubs on the perforated plate.

The materials for the plastic covering are preferably chosen from the group of substances comprising polyolefins, preferably polyethylene, polypropylene and poly(iso)butylene, since these on the one hand have adequate resistance to abrasion/erosion and corrosion and on the other hand can be applied as a shrink-fit tube. Other possible materials for the plastic coverings or shrink-fit tubes are PVDF, Viton, PVC and PTFE.

The use of a shrink-fit tube has the following advantages over other solutions:

Solid, impermeable coverings can be realized; a functional distinction is possible by covering with different shrink-fit tube materials. For example, a material with high erosion resistance may be applied on the outside and a material with high corrosion resistance may be applied on the inside.

The connection to the regions to be protected is positive. Extraction or cleaning media cannot "creep" under the covering. Additional sealing of the covering is not required.

Any desired lengths can be protected by joining tube segments to one another in an overlapping manner.

Transitions in diameter and cross section, such as here at the clamping sets, can be overcome on the basis of the shrinkage rates of up to 3:1 (change in diameter).

This is a low-cost solution, since commercially available shrink-fit tubes in any desired dimensions can be used and easily applied.

Figure 5:
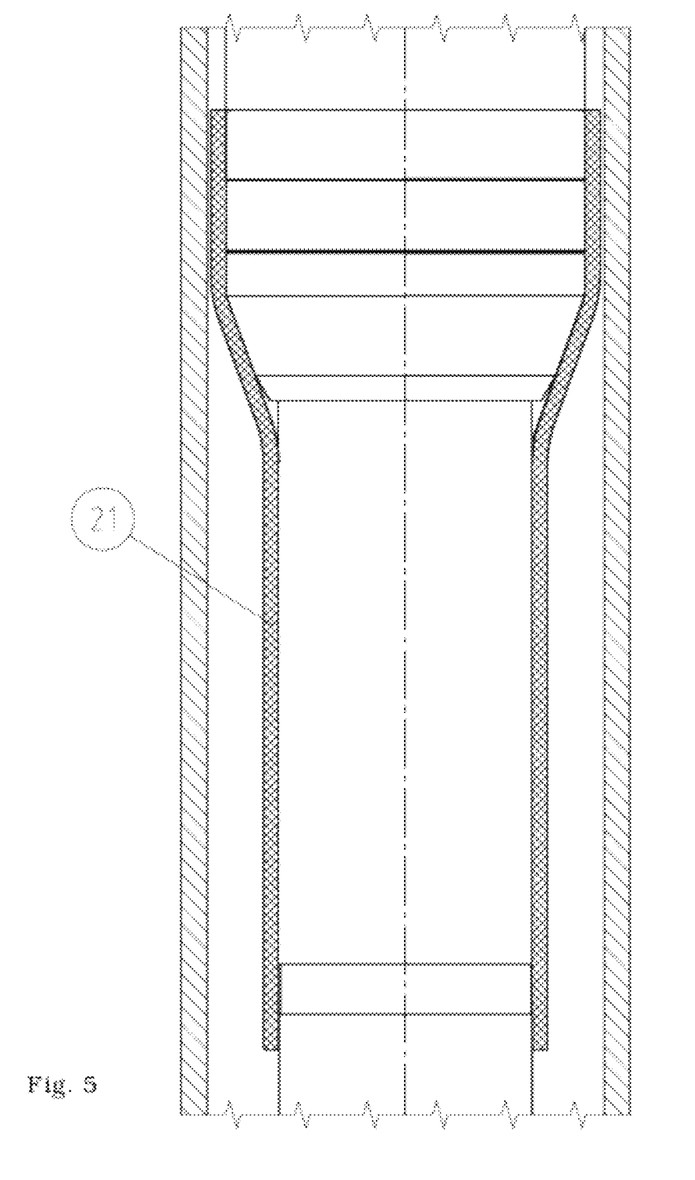
FIG. 5 shows a schematic representation of a protective enclosure of clamping devices, a portion of the extraction pipe and sleeve region lying outside the wear-resistant annular stack.

A configuration of the shrink-fit tube 21 is represented in FIG. 5.

EXAMPLES

The following examples serve for further explanation of the invention.

Example 1

Resistance to Erosion

To determine the erosive wear, plates (about 75×75×15 mm) of coarse-grained, sintered silicon carbide ceramic (SSiC) of the type EKasic® C (ESK Ceramics GmbH & Co. KG) and of fine-grained, sintered silicon carbide ceramic (SSiC) of the type EKasic® F (ESK Ceramics GmbH & Co. KG) were subjected to a sand blasting test. A steel specimen served as a reference.

The tests were carried out by means of a sand blasting installation. Four different supporting materials that are typically used in offshore drilling operations served as blasting media: (1) 100 Mesh Frac Sand, (2) 16/20 Mesh Frac Sand, (3) 20/40 Mesh Frac Sand and (4) 20/40 Mesh Frac Sand High Strength. The blasting pressure was 2 bar and the blasting duration 2 hours, the jet being applied almost in the form of a point at an angle of 90° to the surface. The depth and width of the blasting impression characterize the erosive wear (see Table 1). The tests show that the sintered silicon carbide ceramics are much more resistant to erosive wear in comparison with conventional steels. Both EKasic® C and EKasic® F showed no measurable wear, or at most negligible erosive wear.

TABLE 1

Results of the sand blasting tests

| Example | Material | Blasting agent | Depth [mm] | Width [mm] |
|---|---|---|---|---|
| 1.1 | EKasic ® C (SSiC) | 1 | not measurable | 12 |
| 1.2 | EKasic ® C (SSiC) | 2 | not measurable | 13 |
| 1.3 | EKasic ® C (SSiC) | 3 | not measurable | 12 |
| 1.4 | EKasic ® C (SSiC) | 4 | not measurable | 9 |
| 1.5 | EKasic ® F (SSiC) | 1 | 0.1 | 14 |
| 1.6 | EKasic ® F (SSiC) | 2 | not measurable | 12 |
| 1.7 | EKasic ® F (SSiC) | 3 | not measurable | 12 |
| 1.8 | EKasic ® F (SSiC) | 4 | 0.2 | 8 |
| 1.9 | Steel (reference) | 1 | 5.3 | 17 |
| 1.10 | Steel (reference) | 2 | 0.8 | 18 |
| 1.11 | Steel (reference) | 3 | 5.3 | 18 |
| 1.12 | Steel (reference) | 4 | 4.4 | 19 |

Example 2

Resistance to Corrosion

Bars (about 3×4×25 mm) of coarse-grained silicon carbide ceramic of the type EKasic® C and of fine-grained silicon carbide ceramic of the type EKasic® F were subjected to a corrosion test.

Three bars of each type were immersed in the liquid to be investigated at 80° C. in a closable, heatable container for 14 days. Serving as liquids in this case were two different acid mixtures that are typically used in offshore drilling operations: (1) $H_2SO_4$, 70% and (2) HCl 12%/HF 2%. Following exposure, the changes in mass were determined to characterize the corrosive wear.

The tests show that the sintered silicon carbide ceramics have excellent corrosion resistance. Both EKasic® C and EKasic® F showed no measurable or detectable wear when exposed to HCl and $H_2SO_4$.

TABLE 2

Results of the corrosion tests

| Example | Material | Corrosion medium | Loss in mass % |
|---|---|---|---|
| 2.1 | EKasic ® F/C (SSiC) | $H_2SO_4$, 70% | not measurable |
| 2.2 | EKasic ® F/C (SSiC) | HCl 12%/HF 3% | not measurable |

Example 3

Flow-Through Test

A separating device was produced from a ceramic annular stack and subjected to a flow-through performance test in order to determine the pressure loss at different through-flow rates.

Rings

The annular disks have an outside diameter of 130 mm and an inside diameter of 109 mm. The ring height is optionally 3, 5 and 8 mm. The lower side is concavely curved, the radius of curvature is 2000 mm. The upper side is uncurved and planar with three spacers in the form of spherical caps with a radius R=25 mm. The gap height at the outside diameter is 0.25 or 0.45 mm. The annular disks are produced from silicon carbide.

Test Apparatus

The test apparatus comprises an inner pipe, a stack of annular disks and an outer covering.

The inner pipe has a diameter of 101 mm and a length of 300 mm. In the middle of the lateral surface there are four openings (23 in FIG. 3), which are offset by 90° and through which the extracted medium can flow into the inner pipe. The inner pipe consequently corresponds to devices that are usually used and are commercially obtainable.

By means of a supporting structure, which is formed by three rods which guide the annular disks on the inner side thereof, the annular disks are stacked around the inner pipe in such a way that the spacers lie one above the other and a radial gap forms. The overall length of the test apparatus is 300 mm. Depending on the respectively chosen geometry of the annular disks, the separating device consequently comprises 38 to 105 disks. This corresponds to a free filtering area of 5 to 16%.

The test apparatus is covered outwardly by a perforated plate of a thickness of 2 mm. The square holes have a length of about 10 mm and are arranged regularly at a spacing of 15 mm.

Flow-Through Test

Figure 6:
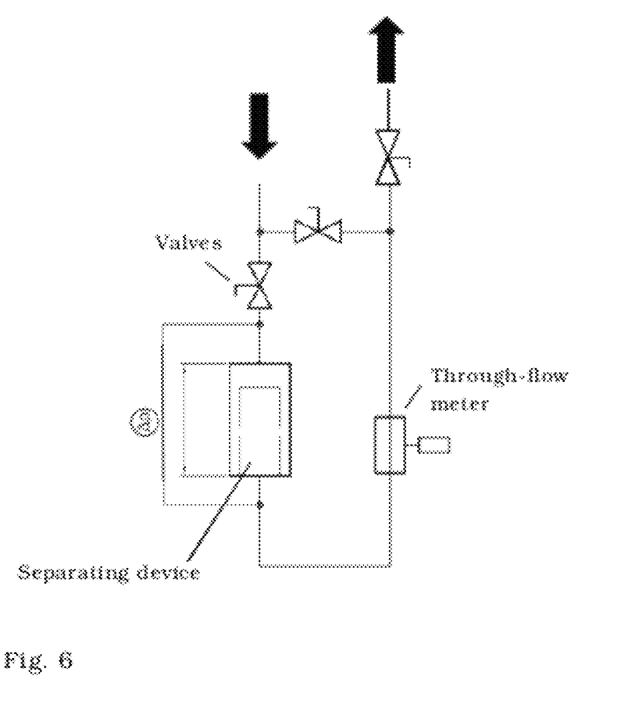
FIG. 6 schematically shows the test setup for a flow-through performance test.

The test was carried out by means of the setup represented in FIG. 6. The test apparatus was installed in a cylindrical housing, via the end faces of which water (density 1.0 g/cm³, dynamic viscosity 1 cP) was supplied at room temperature. The separating device was subjected to flow via the perforated plate and the gaps at the outer diameter of the stacked annular disks. The outflow took place through the inner pipe. The pressure loss between entering and leaving the housing is measured in dependence on the through-flow.

The test results are presented in Table 3. The pressure loss is very low for all through-flows, so that the output is not disadvantageously influenced. At the same time, the low pressure loss is an indication that the separating device is flowed through in a laminar manner.

TABLE 3

Results of the flow-through performance test

| | | | | Example | | | |
|---|---|---|---|---|---|---|---|
| | | | | 3.1 | 3.2 | 3.3 | 3.4 |
| Rings | Outside diameter | $D_a$ | mm | 130 | 130 | 130 | 130 |
| | Inside diameter | $D_i$ | mm | 109 | 109 | 109 | 109 |
| | Average disk height | $h_m$ | mm | 3 | 5 | 8 | 5 |
| | Gap height at outside diameter | $s_a$ | mm | 0.45 | 0.45 | 0.45 | 0.25 |
| Annular stack | Overall length | 1 | mm | 300 | 300 | 300 | 300 |
| | Number of annular elements | n | — | 105 | 62 | 38 | 62 |
| | Free filtering area | — | % | 15.6 | 9.2 | 5.6 | 5.1 |

| Flow | Through-flow Q [l/min] | Pressure loss Δp [Pa] | | | |
|---|---|---|---|---|---|
| | 22 | 173 | 185 | 531 | 213 |
| | 36 | 297 | 349 | 672 | 401 |
| | 50 | 452 | 567 | 916 | 641 |
| | 80 | 1119 | 1201 | 1788 | 1392 |
| | 110 | 2062 | 2201 | 2684 | 2494 |
| | 220 | 7834 | — | 9070 | — |

Example 4

Pressure Test

A number of annular sacks were subjected to a pressure test, in order to simulate the effect of increased compressive stress on the separating device. The annular disks were configured according to Example 3, the stack in each case comprising 10 disks. The spacers were arranged in line one above the other. The loading took place axially by means of a hydraulic press, the force being applied continuously until at least one of the annular disks fractured.

The test results are presented in Table 4.

The tests show that the annular stacks also retain their mechanical integrity under high compressive stresses. Consequently, the separating device can be mechanically clamped securely. It is sufficiently stable against overloading.

TABLE 4

Results of the pressure test

| | | | | Example | | | |
|---|---|---|---|---|---|---|---|
| | | | | 4.1 | 4.2 | 4.3 | 4.4 |
| Rings | Outside diameter | $D_a$ | mm | 130 | 130 | 130 | 130 |
| | Inside diameter | $D_i$ | mm | 109 | 109 | 109 | 109 |
| | Average disk height | $h_m$ | mm | 3 | 5 | 8 | 5 |
| | Gap height at outside diameter | $s_a$ | mm | 0.45 | 0.45 | 0.45 | 0.25 |
| Annular stack | Number of rings | n | — | 10 | 10 | 10 | 10 |
| Compressive strength | Fracture load | $F_D$ | kN | 2.7 | 5.2 | >8.0 | 6.0 |

Example 5

The example shows how a separating device according to the invention is fastened on an extraction pipe according to FIGS. 3, 4a and 4b.

The extraction pipe 22 has a length of 1200 mm and a minimum diameter of 90 mm. Halfway along the pipe there are four openings 23 in the lateral surface, which are offset by 90° and through which the filter medium can be made to pass into the interior of the pipe. At each of the ends, the pipe has a connecting region with an internal thread and an external thread (pup joints), with the aid of which the pipe can be connected to upstream and downstream equipment of the drilling pipe string during completion.

The openings 23 in the extraction pipe 22 are protected by the separating device according to the invention. The separating device comprises the annular-gap filter (annular stack), coupling-on elements and the clamping device, with the aid of which the annular-gap filter is mechanically braced within itself, secured and fastened on the pipe. The separating device has a length of 570 mm and an outside diameter of 143 mm. It is arranged symmetrically in relation to half the pipe length (middle of the opening, middle of the pipe).

The annular disks are produced according to FIGS. 1a-1f. They have an outside diameter of 130 mm and an inside diameter of 109 mm. The ring height is 5 mm. The lower side is concavely curved. The radius of curvature is 2000 mm. A depression is respectively formed at the positions at which the spacers of the neighboring annular disk in the stack lie. The upper side is uncurved and planar; it has three spacers in the form of spherical caps with a radius R=25 mm. The height of the spherical portions is chosen to be 0.4 mm, so that the gap height at the outside diameter is 0.25 mm. The annular disks are produced from silicon carbide (EKasic® F plus).

The annular disks are stacked around the extraction pipe and aligned such that a radial gap respectively forms between the disks, perpendicularly in relation to the longitudinal axis of the extraction pipe.

The stacked annular disks are guided by the spacer. The latter comprises three guiding rods 9 (PEEK rods with a diameter of 6 mm), which guide the annular disks at the grooves of the inner sides. The ends of a guiding rod 9 lie on both sides on guiding rings 7, 8. The guiding rings enclose the extraction pipe 22 and have been pushed onto it.

The annular stack (without coupling-on segments) has an overall length of 351 mm and comprises 75 disks. This corresponds to a free filtering area of 5%.

The end-side termination of the annular stack 20 is formed by two ceramic coupling-on segments 18, 19 of EKasic® F plus. They have an outside diameter of 133 mm, an inside diameter of 109 mm and a height of 17 mm. A groove for receiving a sealing ring has been introduced on the outer circumference (FIG. 2).

In the longitudinal direction, the annular stack is braced with the aid of 8 compression springs made of steel, which—guided on the outside—are arranged symmetrically in the compression spring seat.

The fastening on the extraction pipe takes place with the aid of a clamping set according to FIGS. 3, 4a and 4b, which is formed by a clamping sleeve, clamping nut and compression spring seat.

The separating device is outwardly covered by a perforated plate of a thickness of 2 mm. The square holes have a length of about 10 mm; they are arranged regularly at a spacing of 5 mm.

List of reference numerals

| | |
|---|---|
| 1 | Clamping sleeve |
| 1a | Thread |
| 1b | Conical wedge surface |
| 2 | Clamping sleeve |
| 2a | Thread |
| 2b | Conical wedge surface |
| 3 | Compression spring seat |
| 4 | Compression spring seat |
| 5 | Clamping nut |
| 6 | Clamping nut |
| 7 | Guiding ring |
| 8 | Guiding ring |
| 9 | Guiding rod |
| 10 | Receptacle for outer cage |
| 11 | Outer cage |
| 12 | Spacer strips |
| 13 | Compression spring |
| 14 | O-ring |
| 15 | O-ring |
| 16 | O-ring |
| 17 | O-ring |
| 18 | Upper coupling-on element |
| 19 | Lower coupling-on element |
| 20 | Annular stack |
| 21 | Protective enclosure |
| 22 | Extraction pipe |
| 23 | Opening |
| 24 | Well casing |
| 30 | Annular disk |
| 31 | Upper side of annular disk |
| 32 | Spacer |
| 33 | Clearance |
| 34 | Lower side of annular disk |
| 35 | Clearance |
| 36 | Outer edges |
| 37 | Separating gap |
| 38 | Groove |
| 39 | Clearance |

The invention claimed is:

1. A separating device for a tubular flow-through device (22) for extracting liquids or gases from wells drilled in rock or deep wells, the separating device being suitable for removal of sand and rock particles and comprising:
   an annular stack (20) of brittle-hard annular disks, the disks (30) being stacked and braced in such a way that a separating gap (37) for the removal of sand and rock particles is present in each case between the individual disks (30),
   a coupling-on element (18, 19) at one or both ends of the annular stack (20) configured to uniformly transfer clamping forces to the annular stack, and
   a clamping device at one or both ends of the annular stack (20) coupled onto the coupling-on element to flexibly brace the brittle-hard annular disks (30) and variably fasten the annular stack (20) on the tubular flow-through device (22), wherein an inner diameter of the annular disks is greater than a diameter of the tubular flow-through device.

2. The separating device as claimed in claim 1, the annular disks (30) having on their upper side (31) at least three spacers (32), which are distributed uniformly over the circular circumference of the disks and make it possible to set the height of the separating gap (37) (gap width).

3. The separating device as claimed in claim 2, the spacers (32) being given the form of spherical portions.

4. The separating device as claimed in claim 2, the annular disks (30) having on their underside (34) at least three depressions (35), in which the spacers (32) can be positioned.

5. The separating device as claimed in claim 1, the annular disks (30) having on their inner circumferential surface at least three clearances (33), which serve for receiving guiding rods (9).

6. The separating device as claimed in claim 1, the upper side (31) of the annular disks (30) being formed at a right angle to the disk axis.

7. The separating device as claimed in claim 1, the upper side (31) of the annular disks (30) being formed sloping down outward or inward with a planar or curved surface.

8. The separating device as claimed in claim 1, an underside (34) of the annular disks (30) being formed sloping down outward or inward.

9. The separating device as claimed in claim 1, the outer edges (36) of the annular disks (30) being beveled or rounded.

10. The separating device as claimed in claim 1, the radial wall thickness of the annular disks (30) being at least 2.5 mm.

11. The separating device as claimed in claim 1, the thickness of the annular disks being 1 to 20 mm.

12. The separating device as claimed in claim 1, the separating gap (37) between the individual disks (30) having a height of 0.05-1 mm.

13. The separating device as claimed in claim 1, the brittle-hard material of the annular disks (30) being chosen from oxidic and non-oxidic ceramic materials, mixed ceramics of these materials, ceramic materials with the addition of secondary phases, mixed materials with fractions of ceramic hard materials and with a metallic binding phase, precipitation-hardened casting materials, powder-metallurgical materials with hard material phases formed in situ and long- and/or short-fiber-reinforced ceramic materials.

14. The separating device as claimed in claim 13, the brittle-hard materials having a density of at least 90% of the theoretical density.

15. The separating device as claimed in claim 13, the brittle-hard material being sintered silicon carbide (SSiC) or boron carbide.

16. The separating device as claimed in claim 13, the brittle-hard materials having a density of at least 95% of the theoretical density.

17. The separating device as claimed in claim 1, the coupling-on elements (18, 19) having on their outer circumferential surface at least one peripheral groove (38) for receiving a sealing ring (14).

18. The separating device as claimed in claim 1, the coupling-on elements (18, 19) having on their inner circumferential surface at least three clearances (39), which serve for receiving guiding rods (9).

19. The separating device as claimed in claim 1, the outside diameter of the coupling-on elements (18, 19) being equal to or greater than that of the annular disks (30).

20. The separating device as claimed in claim 1, the coupling-on elements (18, 19) being produced from the same brittle-hard material as the annular disks (30).

21. The separating device as claimed in claim 1, the clamping device comprising clamping sleeves (1, 2), compression springs (13), compression spring seats (3, 4) and clamping nuts (5, 6).

22. The separating device as claimed in claim 21, the clamping device being produced from steel.

23. The separating device as claimed in claim 21, the clamping device being produced from corrosion-resistant steel.

24. The separating device as claimed in claim 1, which also comprises a spacer as an assembling and guiding aid and/or an outer cage (11) and/or one or more protective enclosures (21).

25. The use of a separating device as claimed in claim 1, for removing sand and rock particles in a process for extracting liquids or gases from wells drilled in rock or deep wells by means of tubular flow-through devices.

26. The separating device as claimed in claim 1, an underside (34) of the annular disks (30) being formed concavely.

27. The separating device as claimed in claim 1, the radial wall thickness of the annular disks (30) being at least 5 mm.

28. The separating device as claimed in claim 1, the thickness of the annular disks being 1 to 10 mm.

29. The separating device as claimed in claim 1, the separating gap (37) between the individual disks (30) having a height of 0.1-0.5 mm.

* * * * *

UNITED STATES PATENT AND TRADEMARK OFFICE
CERTIFICATE OF CORRECTION

PATENT NO. : 8,833,447 B2
APPLICATION NO. : 13/384989
DATED : September 16, 2014
INVENTOR(S) : Siegfried Mussig et al.

It is certified that error appears in the above-identified patent and that said Letters Patent is hereby corrected as shown below:

ON THE TITLE PAGE

Item (73) Assignee from:

Assignee: ESK Ceramics GmbH & Co. KG. Copenhagen (DK), to the correct Assignee information:

Assignees: ESK Ceramics GmbH & Co. KG
Kempton (DE)
and
Maersk Olie OG Gas AS
Copenhagen (DK)

Signed and Sealed this
Thirteenth Day of October, 2015

Michelle K. Lee
*Director of the United States Patent and Trademark Office*